(12) United States Patent
Wang et al.

(10) Patent No.: US 10,850,663 B1
(45) Date of Patent: Dec. 1, 2020

(54) WARNING TRIANGLE STRUCTURE

(71) Applicant: HONGFUJIN PRECISION ELECTRONICS(TIANJIN)CO.,LTD., Tianjin (CN)

(72) Inventors: Pao-Ching Wang, New Taipei (TW); Ke-Cheng Lin, New Taipei (TW); Chuang-Wei Tseng, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/680,798

(22) Filed: Nov. 12, 2019

(30) Foreign Application Priority Data

Sep. 2, 2019 (CN) .......................... 2019 1 0824281

(51) Int. Cl.
*B60Q 7/00* (2006.01)
*G09F 13/16* (2006.01)

(52) U.S. Cl.
CPC ............ *B60Q 7/005* (2013.01); *G09F 13/16* (2013.01)

(58) Field of Classification Search
CPC ........... B60Q 7/005; B60Q 7/00; G09F 13/16; G09F 19/22; G08G 1/0955; E01F 9/692; E01F 9/688; E01F 9/608; E01F 9/646; E01F 9/658; E01F 9/70
USPC ...... 340/473, 471, 691.1, 468, 691.6, 693.5; 40/608, 610, 603
See application file for complete search history.

(56) References Cited

U.S. PATENT DOCUMENTS

| 4,952,910 A * | 8/1990 | Straten ..................... B60Q 7/00 340/473 |
| 5,446,984 A * | 9/1995 | Kulp ................... G09F 15/0056 248/219.2 |
| 9,038,297 B1 * | 5/2015 | Theobald .................. G09F 7/22 40/606.01 |
| 2007/0189028 A1 * | 8/2007 | Chen ........................ B60O 7/00 362/545 |
| 2015/0114281 A1 * | 4/2015 | Bartuli ..................... G09F 19/22 116/63 T |
| 2017/0210287 A1 * | 7/2017 | Xia ........................ G08G 1/0955 |
| 2017/0274819 A1 * | 9/2017 | Domingo ................. B60Q 7/00 |

FOREIGN PATENT DOCUMENTS

EP 3419007 A1 12/2018
JP S4872878 U 9/1973

* cited by examiner

*Primary Examiner* — Anh V La
(74) *Attorney, Agent, or Firm* — ScienBiziP, P.C.

(57) ABSTRACT

A warning triangle structure includes a base, a triangular frame, a pulling assembly, and a fluorescent cloth. The triangular frame includes a bottom end and a top end opposite the bottom end. The bottom end is fixedly coupled to the base. The pulling assembly is located adjacent to the top end. The pulling assembly includes a spring and a drawstring that is resiliently coupled to the spring and that is stretchable relative to the spring. The fluorescent cloth includes a fixed end fixed to the triangular frame and a movable end coupled to the drawstring. The movable end is configured to be closed or opened relative to the triangular frame.

12 Claims, 3 Drawing Sheets

WARNING TRIANGLE STRUCTURE

FIELD

The subject matter herein generally relates to warning triangles, and more particularly to a warning triangle having a wind resistance function.

BACKGROUND

Generally, a warning triangle is placed behind a car accident. However, in the event of strong wind, the warning triangle may be blown over or blown away, which is unsafe.

BRIEF DESCRIPTION OF THE DRAWINGS

Implementations of the present disclosure will now be described, by way of embodiments, with reference to the attached figures.

DETAILED DESCRIPTION

Figure 1:
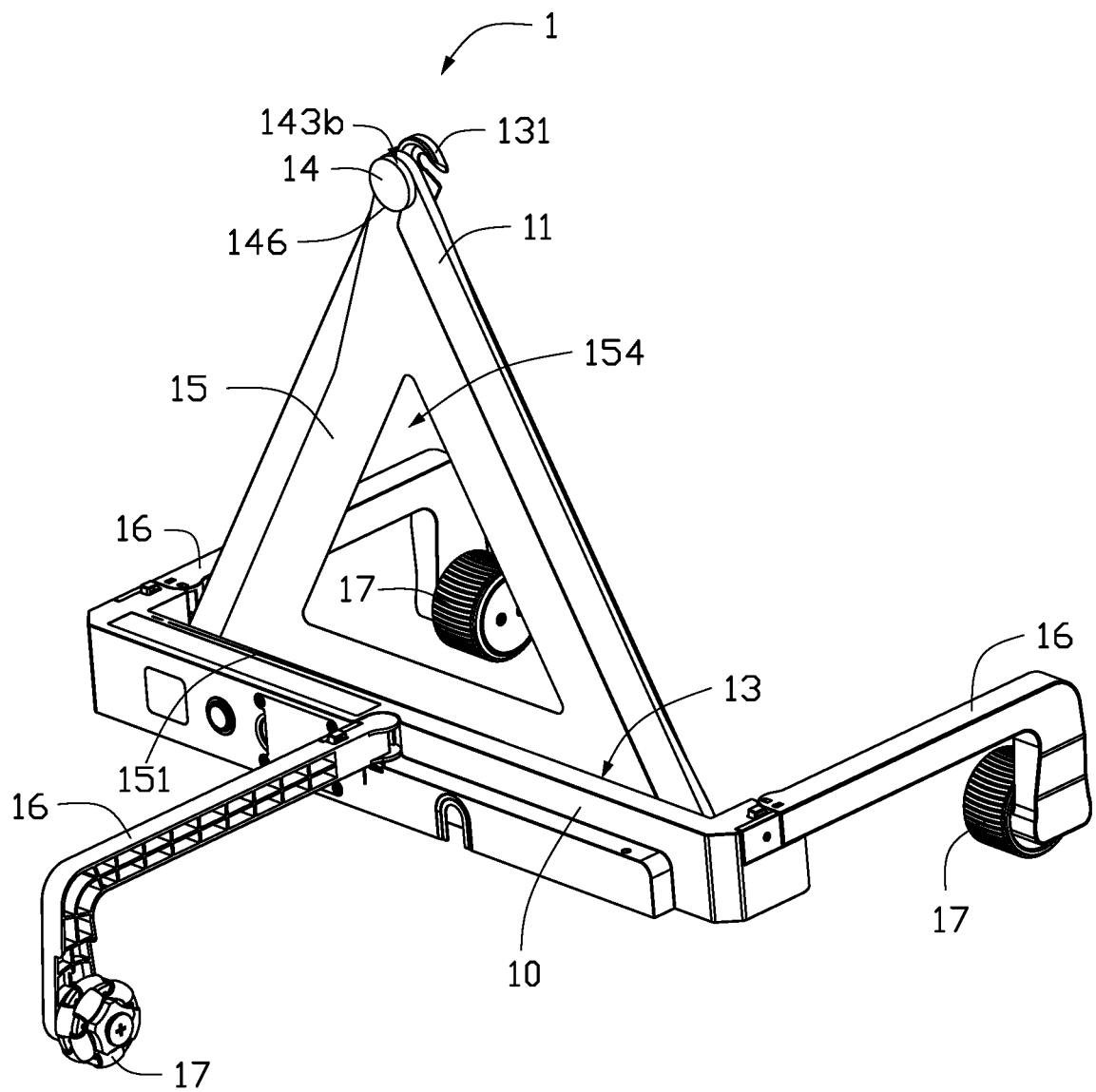
FIG. 1 is an assembled, isometric view of an embodiment of a warning triangle structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a warning triangle structure 1 for resisting wind movement during use.

The warning triangle structure 1 includes a base 10, a triangular frame 11 fixed to the base 10, and a fluorescent cloth 15. The triangular frame 11 includes a bottom end 13 and a top end 131 opposite the bottom end 13. The bottom end 13 is fixed to the base 10, and a pulling assembly 14 is located adjacent to the top end 131.

Figure 2:
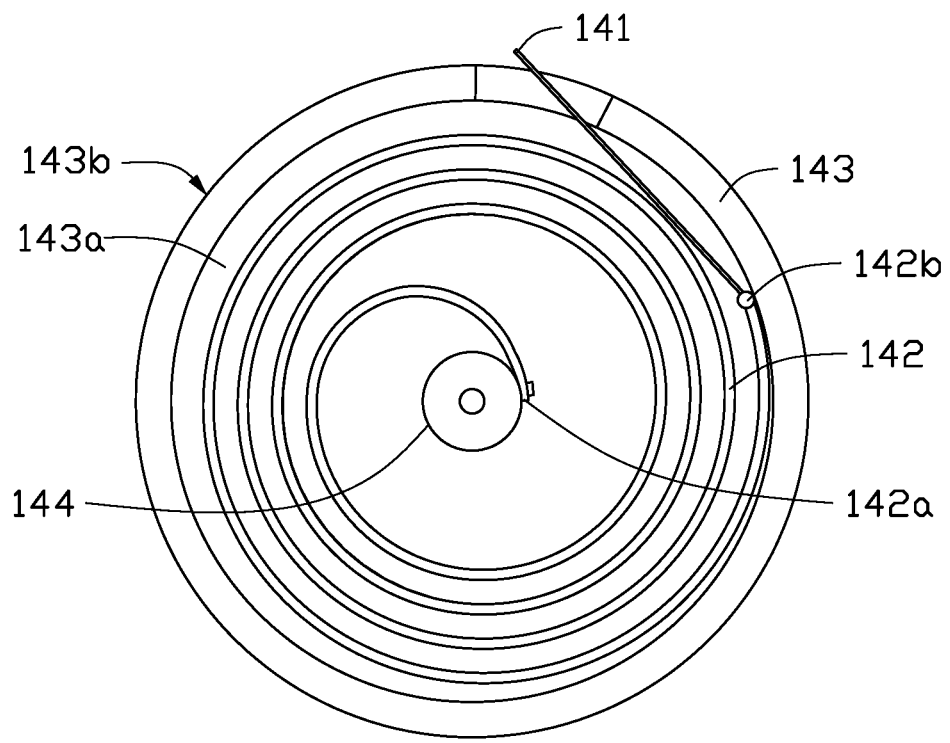
FIG. 2 is a cross-sectional view of a pulling assembly of the warning triangle in different states.
Figure 2:
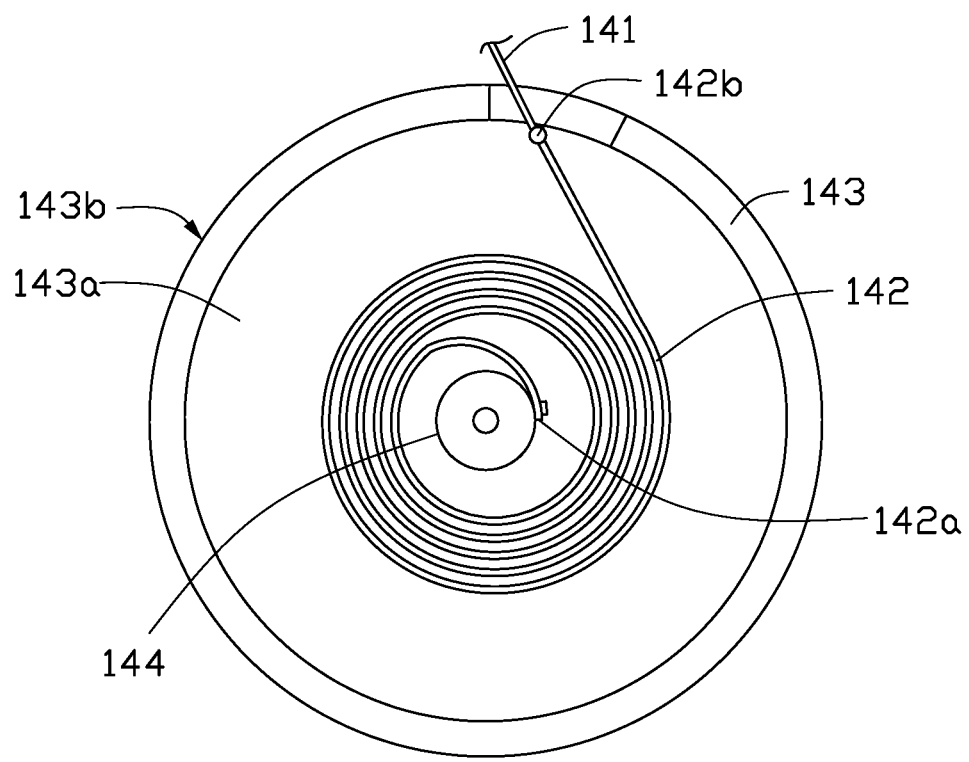

Referring to FIG. 2, the pulling assembly 14 includes a spring 142 and a drawstring 141 that is resiliently coupled to the spring 42 and that is stretchable relative to the spring 142.

Figure 3:
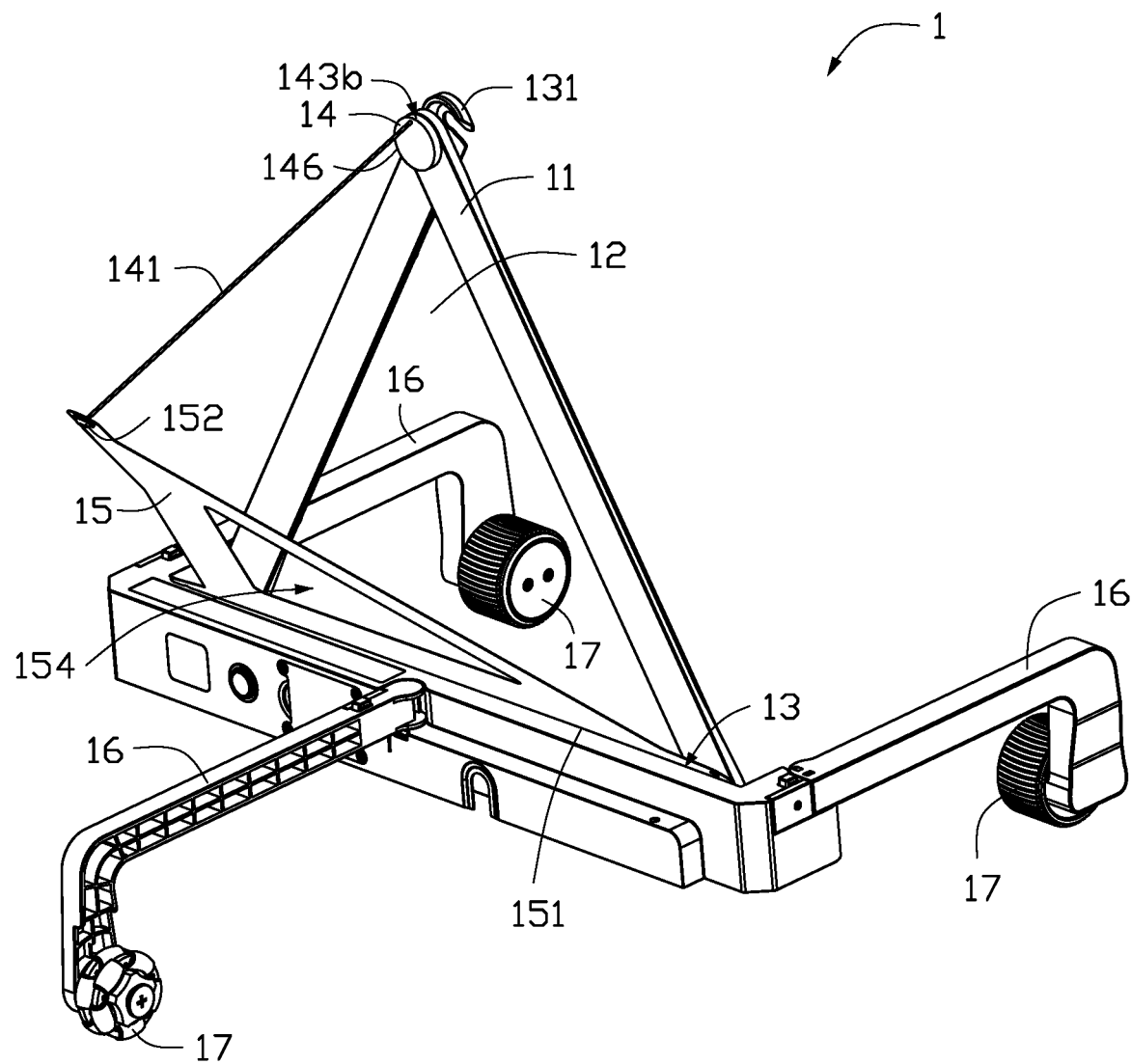
FIG. 3 is similar to FIG. 1, but showing the warning triangle structure in another state.

Referring to FIG. 3, the fluorescent cloth 15 includes a fixed end 151 fixed to the triangular frame 11 and a movable end 152 connected to the drawstring 141. The movable end 152 can be closed or opened relative to the triangular frame 11. In a natural state, the fluorescent cloth 15 almost abuts the triangular frame 11, that is, the fluorescent cloth 15 is closed with respect to the triangular frame 11. Under action of wind, the movable end 152 of the fluorescent cloth 15 may offset from the triangular frame 11, such that the fluorescent cloth 15 is inclined with respect to the triangular frame 11, that is, the fluorescent cloth 15 is opened relative to the triangular frame 11 to reduce resistance to the wind. At this time, the spring 142 is elastically stretched to generate a pulling force against the movable end 152 of the fluorescent cloth 15.

As shown in FIG. 2, one end of the drawstring 141 is connected to the spring 142, and another end of the drawstring 141 is connected to the movable end 152 of the fluorescent cloth 15. When the movable end 152 of the fluorescent cloth 15 is closed relative to the triangular frame 11, the drawstring 141 is crimped relative to the spring 142, and the spring 142 is in an initial state, which is a natural state of the spring 142 or is close to the natural state. When the movable end 152 of the fluorescent cloth 15 is opened relative to the triangular frame 11, the drawstring 141 is stretched relative to the spring 142, and the spring 142 is elastically deformed to apply an elastic pulling force on the drawstring 141. The drawstring 141 causes the wind acting on the fluorescent cloth 15 to significantly increase a moment of the spring 142, at which time the spring 142 is more easily stretched, and at the same time, because of the use of the drawstring 141, an offset angle of the fluorescent cloth 15 relative to the top end 131 is larger, which reduces a resistance of the fluorescent cloth 15 on the wind.

Referring to FIG. 2, the pulling assembly 14 further includes a housing 143 that houses the spring 142. The housing 143 is substantially disk-shaped and includes a bottom wall 143a having an opening (not shown) in the middle and a side wall 143b extending from an edge of the bottom wall 143a in a direction perpendicular to the bottom wall 143a. The triangular frame 11 further includes a fixedly disposed protruding member 144 adjacent to the top end 131. The protruding member 144 passes through the opening in the bottom wall 143a of the housing 143 to fix the housing 143 to the top end 131.

The spring 142 includes a starting end 142a and a distal end 142b. The starting end 142a is fixed to the protruding member 144, and the distal end 142b is fixedly coupled to the pulling cord 141. In one embodiment, the spring 142 is a coil spring, which is a spring that winds an elongate material of equal section into a planar spiral shape. The drawstring 141 is formed of a flexible material such as rayon. When the fluorescent cloth 15 is closed with respect to the triangular frame 11, one end of the drawstring 141 connected to the distal end 142b of the spring 142 projects into the inside of the housing 143, most of the length of the drawstring 141 is contracted inside the housing 143, and a predetermined interval is maintained between adjacent coils of the spring 142.

Referring to FIG. 3, when the fluorescent cloth 15 is opened relative to the triangular frame 11, the spring 142 is contracted (elastically deformed) centered on the starting end 142a fixed to the protruding member 144. The spring 142 is compressed, and the drawstring 141 is pulled out from the casing 143, so that the length of the drawstring 141 outside the casing 143 increases, and the spring 142 applies the recovered pulling force to the drawstring 141.

Referring to FIG. 1 again, the pulling assembly 14 may further include a cover 146 that covers the housing 143 to protect and prevent the spring 142 from coming out of the housing 143.

In one embodiment, the fluorescent cloth 15 is triangular, and a shape of the fluorescent cloth 15 matches a shape of the triangular frame 11. The fixed end 151 is a bottom end of the fluorescent cloth 15 adjacent to the base 10, and the movable end 152 is an apex point opposite the fixed end 151. As shown in FIG. 3, the triangular frame 11 is provided with at least one through hole 12. When the fluorescent cloth 15 is attached to the triangular frame 11 (closed with respect to the triangular frame 11), the fluorescent cloth 15 at least partially covers the through hole 12. The fluorescent cloth 15 may or may not have an opening corresponding to the through hole 12. The fluorescent cloth 15 may have an opening for decreasing resistance to the wind, or may not have an opening for improving a fluorescent effect. In the illustrated embodiment, a through hole 12 is defined in a center of the triangular frame 11, and the fluorescent cloth 15 defines an opening 154 having a size smaller than a size of the through hole 12. The fluorescent cloth 15 overlaps the through hole 12 such that the fluorescent cloth 15 can be observed from a front and back side of the triangular frame 11. In other embodiments, the triangular frame 11 may define a plurality of through holes 12 spaced apart from each other, and the fluorescent cloth 15 may correspondingly define a plurality of openings 154 spaced apart. The fluorescent cloth 15 contains a fluorescent dye which fluoresces.

The base 10 is provided with a plurality of connecting rods 16. One end of each connecting rod 16 is fixed to the base 10, and another end is connected to a corresponding wheel 17. In one embodiment, the base 10 is substantially elongated and columnar, and a number of the connecting rods 16 is three. Each connecting rod 16 is substantially L-shaped. Two of the connecting rods 16 are respectively connected to two ends of the base 10, and one of the connecting rods 16 is connected to a central portion of the base 10. The connecting rod 16 connected to the central portion of the base 10 is located on an opposite side of the base 10 than the two connecting rods 16 connected to the two ends of the base 10.

The warning triangle structure 1 is configured to be placed on a road surface. When the wind is small or when there is no wind, as shown in FIG. 2, the drawstring 141 and the fluorescent cloth 15 do not apply a force on the spring 142, and the spring 142 is not stretched or contracted inside the housing 143. At this time, as shown in FIG. 1, the fluorescent cloth 15 is attached to the triangular frame 11, and the warning triangle structure 1 is in a stable stationary state.

When the wind is large, as shown in FIG. 3, the fluorescent cloth 15 is in an inclined state relative to the triangular frame 11, and the fluorescent cloth 15 and the drawstring 141 apply a pulling force on the spring 142. As shown in FIG. 3, the spring 142 is contracted around the starting end 142a fixed on the protruding member 144. At this time, the spring 142 is in a compressed state and has an elastic force. At this time, the resistance to the wind is reduced.

As the wind decreases, the elastic force returns the fluorescent cloth 15 to the initial state in abutment with the triangular frame 11. Thus, the fluorescent cloth 15 is in dynamic balance with the wind, which prevents the warning triangle structure 1 from being knocked over by the wind.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A warning triangle structure comprising:
a base;
a triangular frame comprising a bottom end and a top end opposite the bottom end, the bottom end fixedly coupled to the base;
a pulling assembly located adjacent to the top end, the pulling assembly comprising a spring and a drawstring that is resiliently coupled to the spring and that is stretchable relative to the spring; and
a fluorescent cloth comprising a fixed end fixed to the triangular frame and a movable end coupled to the drawstring, the movable end configured to be closed or opened relative to the triangular frame;
wherein when the warning triangle structure is subjected to gentle breeze, the spring is not stretched, and the florescent cloth is closed relative to the triangular frame;
wherein when the warning triangle structure is subjected to high wind, the spring is stretched, and the florescent cloth is opened relative to the triangular frame to reduce resistance to the high wind.

2. The warning triangle structure of claim 1, wherein:
one end of the drawstring is coupled to the spring, and another end of the drawstring is coupled to a movable end of the fluorescent cloth;
when the movable end is closed relative to the triangular frame, the drawstring is crimped relative to the spring;
when the movable end is opened relative to the triangular frame, the drawstring is stretched, and the spring is elastically deformed.

3. The warning triangle structure of claim 2, wherein:
the triangular frame comprises a protruding member fixed adjacent to the top end;
the spring comprises a starting end and a distal end;
the starting end is fixed to the protruding member; and
the distal end is fixedly coupled to the pulling cord.

4. The warning triangle structure of claim 3, wherein:
the pulling assembly further comprises a housing;
the spring is received within the housing;
the housing comprises a bottom wall and a side wall extending from an edge of the bottom wall in a direction perpendicular to the bottom wall;
the protruding member passes through the bottom wall to fix the housing to the top end.

5. The warning triangle structure of claim 4, wherein:
the housing is cylindrical.

6. The warning triangle structure of claim 1, wherein:
the fluorescent cloth is triangular;
a shape of the fluorescent cloth matches a shape of the triangular frame;
the fixed end is a bottom end of the fluorescent cloth adjacent to the base; and
the movable end is an apex point opposite the fixed end.

7. The warning triangle structure of claim 1, wherein:
the triangular frame defines at least one through hole;
the fluorescent cloth defines at least one opening corresponding to the at least one through hole; and
the fluorescent cloth partially covers the through hole.

8. The warning triangle structure of claim 1, wherein:
the base comprises a plurality of connecting rods;
one end of each of the plurality of connecting rods is fixed to the base; and
another end of each of the plurality of connecting rods is coupled to a corresponding wheel.

9. The warning triangle structure of claim 8, wherein:
the base is elongated columnar;
a number of the connecting rods is three;
two of the connecting rods are respectively coupled to two ends of the base; and
one of the connecting rods is coupled to a central portion of the base between the other two connecting rods.

10. The warning triangle structure of claim 9, wherein:
the connecting rod coupled to the central portion of the base is located on an opposite side of the base than the two connecting rods connected to the two ends of the base.

11. The warning triangle structure of claim 1, wherein:
the spring is a coil spring.

12. The warning triangle structure of claim 1, wherein:
the drawstring is made of flexible material.

\* \* \* \* \*